(12) United States Patent
Allen et al.

(10) Patent No.: US 7,702,780 B2
(45) Date of Patent: Apr. 20, 2010

(54) MONITORING METHOD, SYSTEM, AND COMPUTER PROGRAM BASED ON SEVERITY AND PERSISTENCE OF PROBLEMS

(75) Inventors: Wade Allen, Efland, NC (US); Paolo Deidda, Rome (IT); David Anthony Fresquez, Cary, NC (US); Antonio Perrone, Rome (IT); Rosalind Radcliffe, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1337 days.

(21) Appl. No.: 11/158,959

(22) Filed: Jun. 22, 2005

(65) Prior Publication Data

US 2007/0005298 A1    Jan. 4, 2007

(51) Int. Cl.
*G06F 15/173* (2006.01)
*G06F 11/00* (2006.01)

(52) U.S. Cl. ............... 709/224; 709/225; 714/4; 714/43; 714/46; 714/47; 714/57

(58) Field of Classification Search ............ 709/223, 709/224; 714/4, 43, 46, 47, 57
See application file for complete search history.

(56) References Cited

U.S. PATENT DOCUMENTS

| | | | | |
|---|---|---|---|---|
| 5,463,775 A * | 10/1995 | DeWitt et al. | ............... | 702/186 |
| 7,246,156 B2 * | 7/2007 | Ginter et al. | ............... | 709/217 |
| 2005/0015665 A1 * | 1/2005 | Kato et al. | ............... | 714/15 |
| 2005/0182969 A1 * | 8/2005 | Ginter et al. | ............... | 713/201 |

* cited by examiner

*Primary Examiner*—Saleh Najjar
*Assistant Examiner*—Farzana Huq
(74) *Attorney, Agent, or Firm*—Rader, Fishman & Grauer PLLC

(57) ABSTRACT

For monitoring a data processing system, a sequence of critical conditions with increasing severity indexes is defined. Each critical condition is detected when a corresponding state parameter exceeds a threshold value with a predefined persistence over time. The persistence may be specified by a minimum number of repeated occurrences of this event, with a maximum number of consecutive non-occurrences that are allowed between them. Whenever critical conditions are detected, the monitoring application retrieves the severity index of the last detected critical condition with the highest severity index, and calculates an incremental index indicative of how closely the state parameter is approaching the next critical condition. An indicator of the health of the system may be generated by subtracting the severity index of the last critical condition plus the incremental index from an optimal value.

11 Claims, 6 Drawing Sheets

Table 405:

|  | MINOR(1) | WARNING(2) | DANGER(3) |
|---|---|---|---|
| $S_i$ | 40 | 60 | 80 |
| $Q_i$ | 60 | 70 | 80 |
| $MO_i$ | 4 | 3 | 2 |
| $MH_i$ | 2 | 1 | 0 |

Table 410:

| INSTANT | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ | $T_{15}$ | $T_{16}$ |
|---|---|---|---|---|---|---|---|---|---|---|---|---|---|---|---|---|
| STATE PARAMETER | 71 | 73 | 69 | 81 | 83 | 79 | 43 | 40 | 73 | 78 | 79 | 83 | 69 | 58 | 55 | 50 |
| GUARD LEVEL | WM | WM | M | DWM | DWM | WM | - | - | WM | WM | WM | DWM | M | - | - | - |
| MINOR $O_1$ | 1 | 2 | 3 | 4 | 5 | 6 | 6 | 6 | 7 | 8 | 9 | 10 | 11 | 12 | 12 | 0 |
| MINOR $H_1$ | 0 | 0 | 0 | 0 | 0 | 0 | 1 | 2 | 0 | 0 | 0 | 0 | 0 | 1 | 2 | 0 |
| WARN. $O_2$ | 1 | 2 | 2 | 3 | 4 | 5 | 5 | 0 | 1 | 2 | 3 | 4 | 4 | 0 | 0 | 0 |
| WARN. $H_2$ | 0 | 0 | 1 | 0 | 0 | 0 | 1 | 0 | 0 | 0 | 0 | 0 | 1 | 0 | 0 | 0 |
| DANG. $O_3$ | 0 | 0 | 0 | 1 | 2 | 0 | 0 | 0 | 0 | 0 | 0 | 1 | 0 | 0 | 0 | 0 |
| DANG. $H_3$ | 0 | 0 | 0 | 0 | 0 | 0 | 0 | 0 | 0 | 0 | 0 | 0 | 0 | 0 | 0 | 0 |
| PROBLEM |  |  |  | W | D | W | W | M | M | M | W | W | W | M | M |  |
| HI |  |  |  | 30 | 20 | 40 | 40 | 60 | 53.3 | 46.7 | 40 | 30 | 40 | 60 | 60 |  |

FIG. 4

MONITORING METHOD, SYSTEM, AND COMPUTER PROGRAM BASED ON SEVERITY AND PERSISTENCE OF PROBLEMS

FIELD OF THE INVENTION

The present invention relates to the data processing field. More specifically, the present invention relates to the monitoring of a data processing system.

BACKGROUND

Applications for monitoring data processing systems play a key role, especially in managing large systems with distributed architectures. Such monitoring applications may be used to detect any critical conditions that occur in the systems. Information gathered by a monitoring application can then be used for enforcing appropriate corrective actions in an attempt to remedy unfavorable situations, or for off-line analysis.

The process of monitoring a system is typically based on the periodic measurement of predefined state parameters such as processing power usage. The monitoring application detects a critical condition when the state parameter reaches a predefined threshold value.

Some monitoring applications known in the art allow defining different levels of critical conditions with corresponding threshold values. For example, if processing power usage is higher than 60% a warning critical condition may be detected, and if processing power usage exceeds 80% a dangerous critical condition is entered. One drawback of this approach is that the monitoring application may report a huge number of critical conditions, since critical conditions are detected as soon as state parameters reach the corresponding threshold values. Therefore, a system administrator may be swamped with notifications caused by transient problems such as spikes in processing power usage.

Different monitoring applications may consider the persistence of critical conditions. In this case, it is possible to define how long a condition must last before being classified as critical. For this purpose, the monitoring application may define a minimum number of times a state parameter must reach its threshold value before being consolidated into the corresponding critical condition. The occurrences of a potentially troublesome event must be consecutive, or at most have a maximum number of allowable missing occurrences or "holes" between them. However, this approach requires the definition of a single critical condition for each state parameter, without the possibility of having different levels of detail.

In any case, monitoring applications known in the art provide only static information about the health of a system. In other words, the administrator is notified simply of the occurrence of a problem, without receiving any information about the actual dynamics of the system.

Therefore, the information provided by the monitoring system can be used only to restore proper operation after a critical condition has been detected, rather than to prevent the occurrence of problems in the future.

SUMMARY

An aspect of the present invention includes a method for monitoring a data processing system so that problems may be anticipated before they occur. A state parameter of the system may be measured over time, for example periodically, and the resulting information used to detect one or more of a plurality of predefined critical conditions for the state parameter, ordered in a sequence with increasing severity. Each critical condition may be detected in response to reaching a corresponding temporal threshold by a persistence of the state parameter at a corresponding guard level. An incremental index indicative of approaching the next critical condition in the sequence may be determined according to a comparison between the current persistence of the state parameter at the guard level of the next critical condition (i.e., the first not-yet-detected, or "non-detected" critical condition) and the corresponding temporal threshold. It is then possible to provide an indication of the criticality of the state parameter, for example, a health indicator. The indication may be based on the most severe detected critical condition in the sequence and the incremental index.

In a preferred embodiment of the invention, a severity index is associated with each critical condition. The health indicator then depends on the sum of the incremental index and the severity index of the most severe detected critical condition. For example, the health indicator may be calculated by subtracting the resulting sum from an optimal value.

The incremental index may be determined based on the ratio between the current persistence and the temporal threshold of the first non-detected critical condition. Typically, each critical condition is defined by the minimum number of times the state parameter must reach a corresponding quantitative threshold. As a further enhancement, a maximum number of missing occurrences of the above-mentioned event (i.e., holes) is allowed. Preferably, the minimum number of occurrences and the maximum number of holes decrease with the severity of the critical conditions. In various embodiments of the invention, a service provider such as a monitoring server may control the execution of the method. A further aspect of the present invention includes a computer program for performing the above-described method. Moreover, another aspect of the present invention includes a corresponding system.

The characterizing features of the present invention are set forth in the appended claims. The invention itself, however, as well as further features and the advantages thereof will be best understood by reference to the following detailed description, given purely by way of a nonrestrictive indication, to be read in conjunction with the accompanying drawings.

BRIEF DESCRIPTION OF THE DRAWINGS

FIG. 4 illustrates an exemplary application scenario of an embodiment of the invention.

DETAILED DESCRIPTION

Figure 1A:
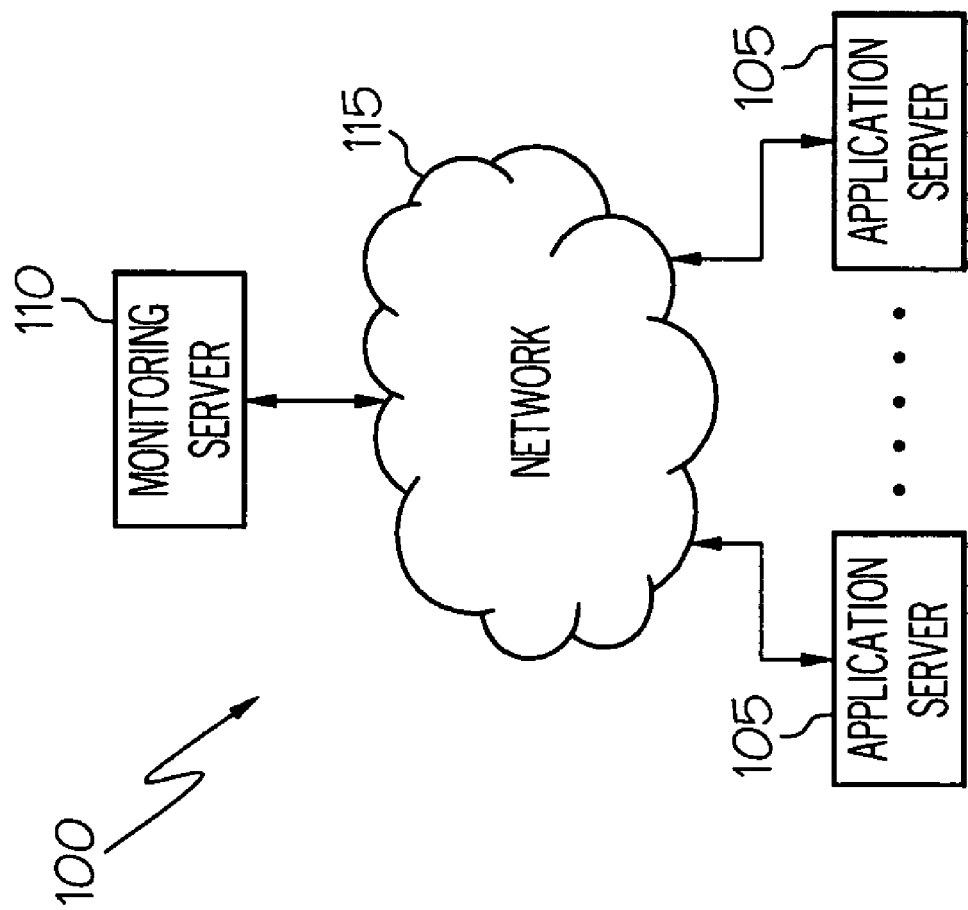
FIG. 1A is a block diagram of a data processing system in which an embodiment of the invention is applicable.

FIG. 1A illustrates an exemplary data processing system 100 with distributed architecture. The system 100 implements a monitoring infrastructure based on, for example, the "IBM Tivoli Monitoring" or "ITM" application by IBM Corporation. Tivoli is a registered trademark of the IBM Corporation, Armonk, N.Y. This infrastructure is used to monitor operation of multiple application servers 105. For example, the application servers 105 consist of WAS nodes that run different end-user applications such as e-business applications. The service of monitoring the application servers 105 is deployed by a central monitoring server 110. For this purpose, the application servers 105 and the monitoring server 110 may communicate through a network 115 such as the Internet.

Figure 1B:
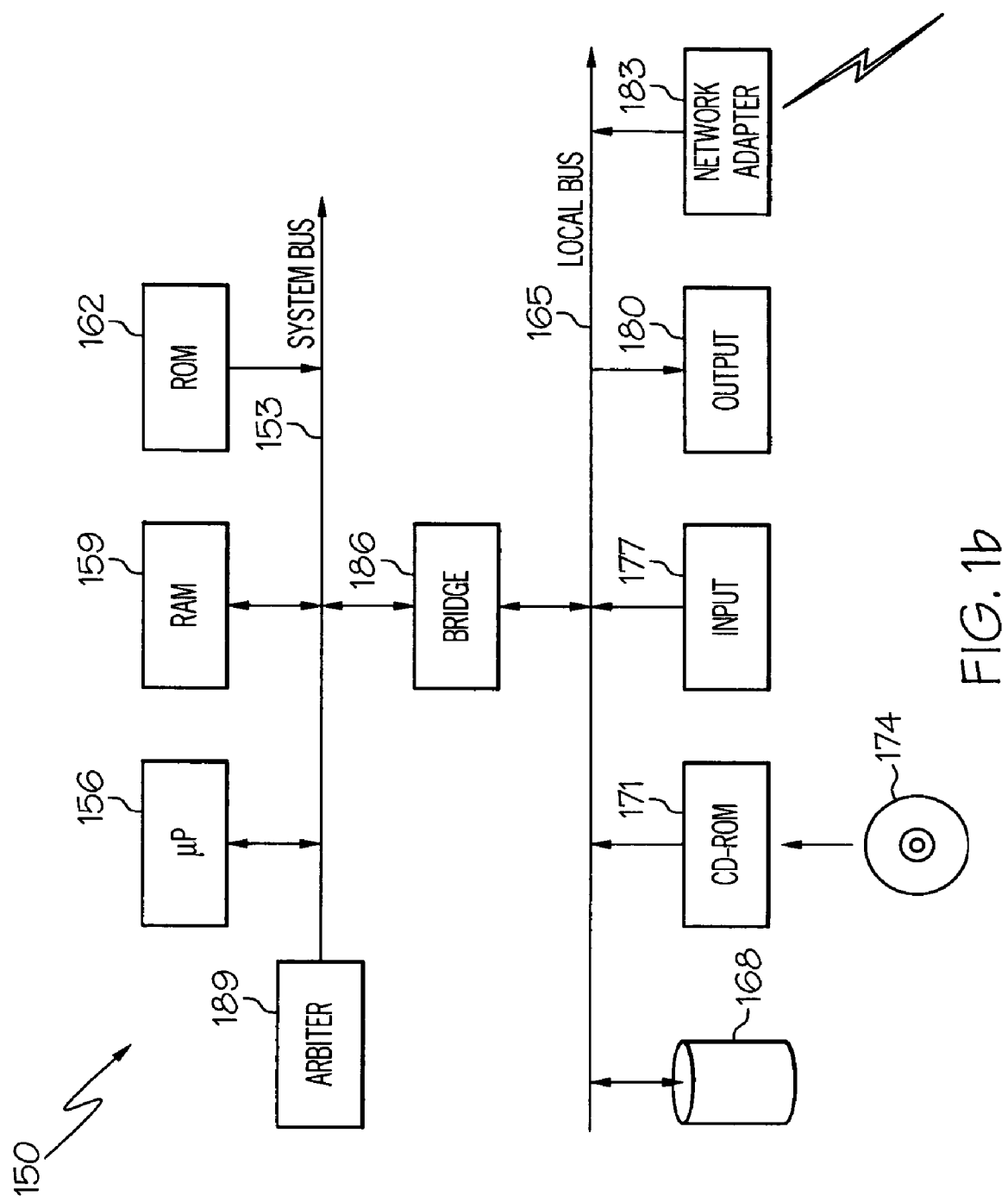
FIG. 1B shows functional blocks of an exemplary computer.

FIG. 1B shows an exemplary, generic computer system 150 (an application server or monitoring server). The computer 150 is formed by several units that are connected in parallel to a system bus 153. In detail, one or more microprocessors (IP) 156 control operation of the computer 150; a RAM 159 is directly used as a working memory by the microprocessors 156, and a ROM 162 stores basic code for a bootstrap of the computer 150. Peripheral units are clustered around a local bus 165 by means of respective interfaces. In this example, a mass memory consists of a hard-disk 168 and a drive 171 for reading CD-ROMs 174. Further, the computer 150 may include input devices 177 such as a keyboard and a mouse, and output devices 180 such as a monitor and a printer. An adapter 183 is used to connect the computer 150 to the network. A bridge unit 186 interfaces the system bus 153 with the local bus 165. Each microprocessor 156 and the bridge unit 186 can operate as master agents requesting access to the system bus 153 for transmitting information. An arbiter 189 manages the granting of the access with mutual exclusion to the system bus 153.

Figure 2:
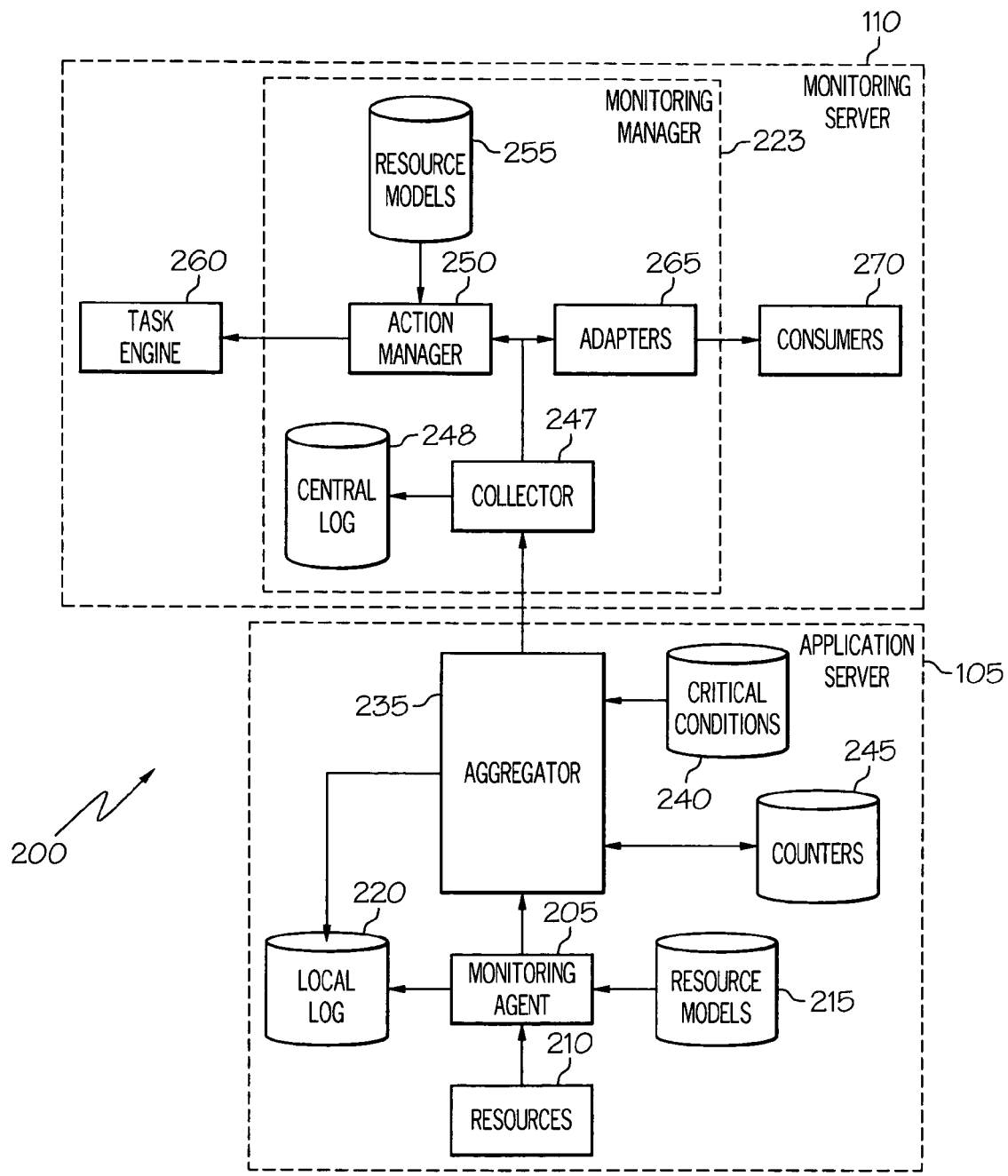
FIG. 2 depicts software components that can be used according to an exemplary embodiment of the invention.

FIG. 2 shows the main software components that run on the above-described system, denoted as a whole with the reference 200. The information (program and data) is typically stored on the hard-disks and loaded, at least partially, into the corresponding working memories when the program is running. The program is initially installed onto the hard-disks from, for example, CD-ROMs.

An agent 205 may be used to monitor relevant hardware and/or software resources 210 of the application server 105. For this purpose, the monitoring agent 205 periodically measures state parameters or metrics of the resources 210, for example every few minutes. The operation is based on predefined resource models 215, each one identifying key state parameters that define correlated resources 210 in a specific context. For example, the resource models 215 involve measuring processing power consumption, memory space usage, and number of end-users concurrently logged for controlling the response time of a web application running on the server 105. The state parameters, generically denoted here with P, can have either absolute values or normalized values ranging from a lower limit (for example, P=0) to an upper limit (for example, P=100). The state parameters measured by the monitoring agent 205 may be saved into a local log 220, and then supplied to an aggregator 235.

The aggregator 235 accesses a table 240, which stores the definition of a series of critical conditions for each state parameter. The critical conditions have strictly increasing severities that are specified by a corresponding index $S_i$ (with i=1 ... N, where N is the number of critical conditions). All the severity indexes $S_i$ are less than or equal to a predefined optimal value K such has K=100. For example, three critical conditions (N=3) can be defined as minor ($S_1$=60), warning ($S_2$=70), and dangerous ($S_3$=80). The occurrence of each critical condition is detected in response to the persistence over time of a corresponding guard level for the state parameter.

The guard level may be specified by a quantitative threshold ($Q_i$) that must be reached by the state parameter P. The quantitative thresholds increase with the severity of the critical conditions; in other words, they are strictly monotone with $Q_{i+1}>Q_i$ for i=1 ... N−1. For example, the minor critical condition might have a quantitative threshold $Q_1$=60, the warning critical condition might have a quantitative threshold $Q_2$=70, and the dangerous critical condition might have a quantitative threshold $Q_3$=80. Thus, the guard levels of the minor critical condition, of the warning critical condition, and of the dangerous critical condition are reached when P>60, P>70, and P>80, respectively. Of course, whenever the state parameter P is at the guard level of a particular critical condition, it is also at the guard level of every critical condition of lower severity.

The persistence may be specified by the minimum number of times the state parameter P must reach the corresponding quantitative threshold $Q_i$ (denoted with $Mo_i$). It is also possible to specify the maximum number of consecutive missing occurrences of this event, i.e., holes, that are allowed between them (denoted with $Mh_i$). Preferably, the minimum occurrences $MO_i$ and the maximum number of consecutive holes $MH_i$ decrease with the severity of the critical conditions, so as to ensure that the critical conditions always occur in succession according to their severity. For example, the minor critical condition might have $MO_1$=4 and $MH_1$=2, the warning critical condition might have $MO_2$=3 and $MH_2$=1, and the dangerous critical condition might have $MO_3$=2 and $MH_3$=0. Thus, in this example, the minor critical condition is detected after P>60 at least four times in six measurement periods, the warning critical condition is detected after P>70 at least three times in four periods, and the dangerous critical condition is detected after P>80 twice in consecutive periods.

For this purpose, the aggregator 235 may maintain counters 245 for each state parameter. Each state parameter may be associated with a pair of counters 245 for each critical condition; a first counter 245 stores the number of the corresponding current occurrences (denoted with $O_i$), and another counter 245 stores the number of the corresponding consecutive current holes (denoted with $H_i$). The aggregator 235 may update the current occurrences $O_i$ and the (consecutive) current holes $H_i$ at every measure of the state parameter.

Whenever the aggregator 235 detects one or more critical conditions for a generic state parameter, it generates a problem notification event. The problem may be defined by a health indicator (denoted with HI), which may be obtained from the optimal value K by subtracting a value representing a criticality of the state parameter. The latter is calculated by summing the highest severity index of the detected critical conditions with an incremental index (denoted with $D_i$) indicative of how closely the state parameter P is approaching the next critical condition of higher severity.

An indication of the problem, with the health indicator HI and the current value of the corresponding state parameter P, may be saved into the local log 220, and then transmitted to the monitoring server 110. In this way, the flow of information from the endpoints to the monitoring server 110 is reduced, because the endpoints notify the monitoring server 110 only when the measured values have become indicative of problems. Thus, this choice provides improved scalability and efficiency of the monitoring infrastructure.

A collector 247 may receive the indications of the problems from the different application servers of the system. The received information may be saved into a central log 248, and then supplied to an action manager 250. The action manager 250 determines an associated corrective action, which is predefined in resource models 255 and deployed to the application servers. This may be done, for example, according to a decision tree based on the condition of multiple state parameters. The action manager 250 accordingly drives a task engine 260, which enforces the application of the corrective action in an attempt to recover the proper operation of the system.

In addition or in alternative, the aggregator 235 may give notice of the problem by passing the same information to one or more adapters 265, which adapters 265 are used to interface the monitoring manager 223 with consumers 270. For example, the consumers 270 may be used to provide instantaneous notification of any problem that may be experienced by the end-users of the application servers, or to track operation of the system over time for service level accounting or for capacity planning analysis. Examples of consumers 270 include operator consoles, provisioning applications, and the like, such as the "Tivoli Enterprise Console" or "TEC" and the "Tivoli Business Systems Manager" or "TBSM" by IBM Corporation.

Figure 3A:
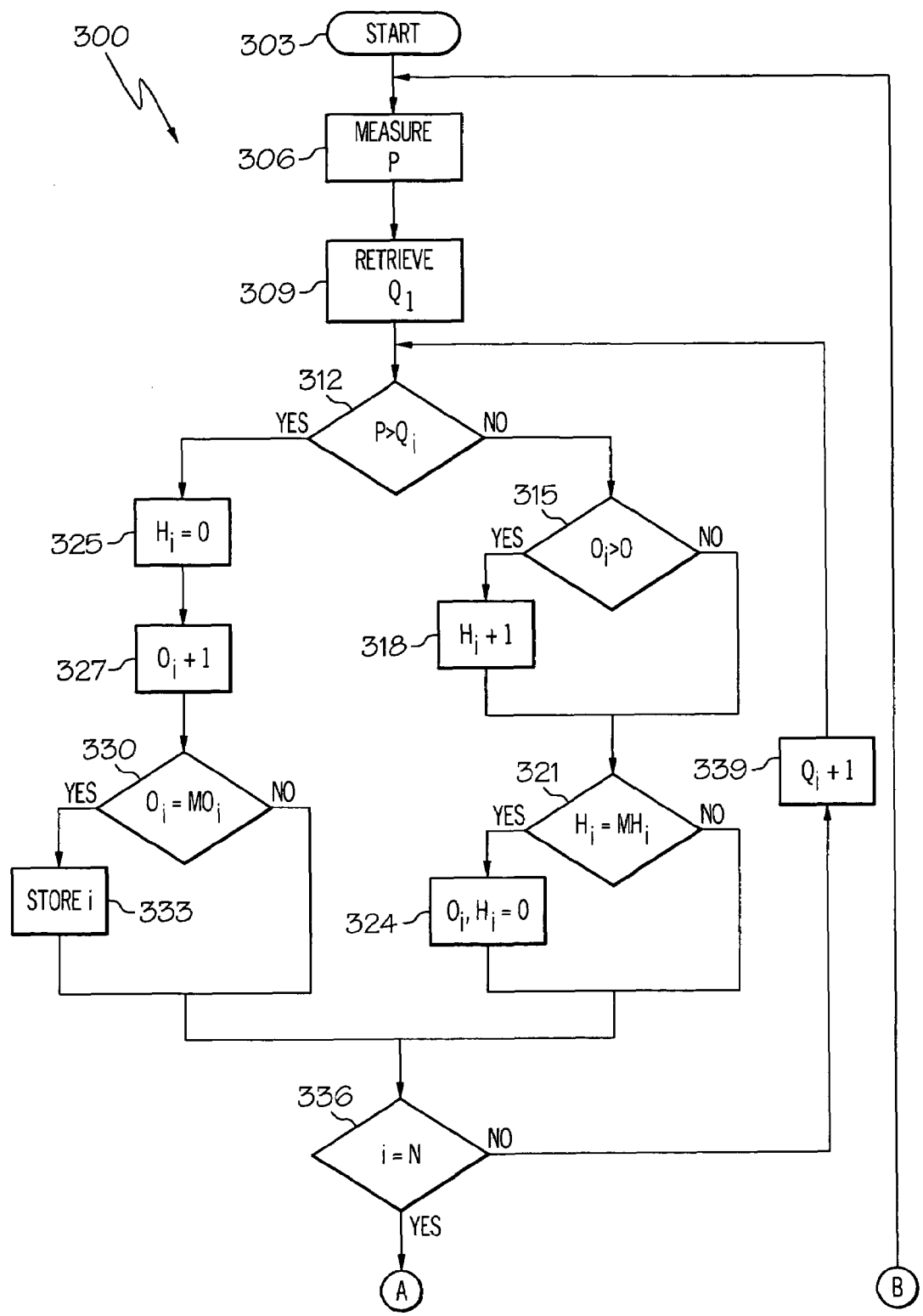
FIGS. 3A-3B are a flow chart describing aspects of the operation of an exemplary embodiment of the invention.
Figure 3B:
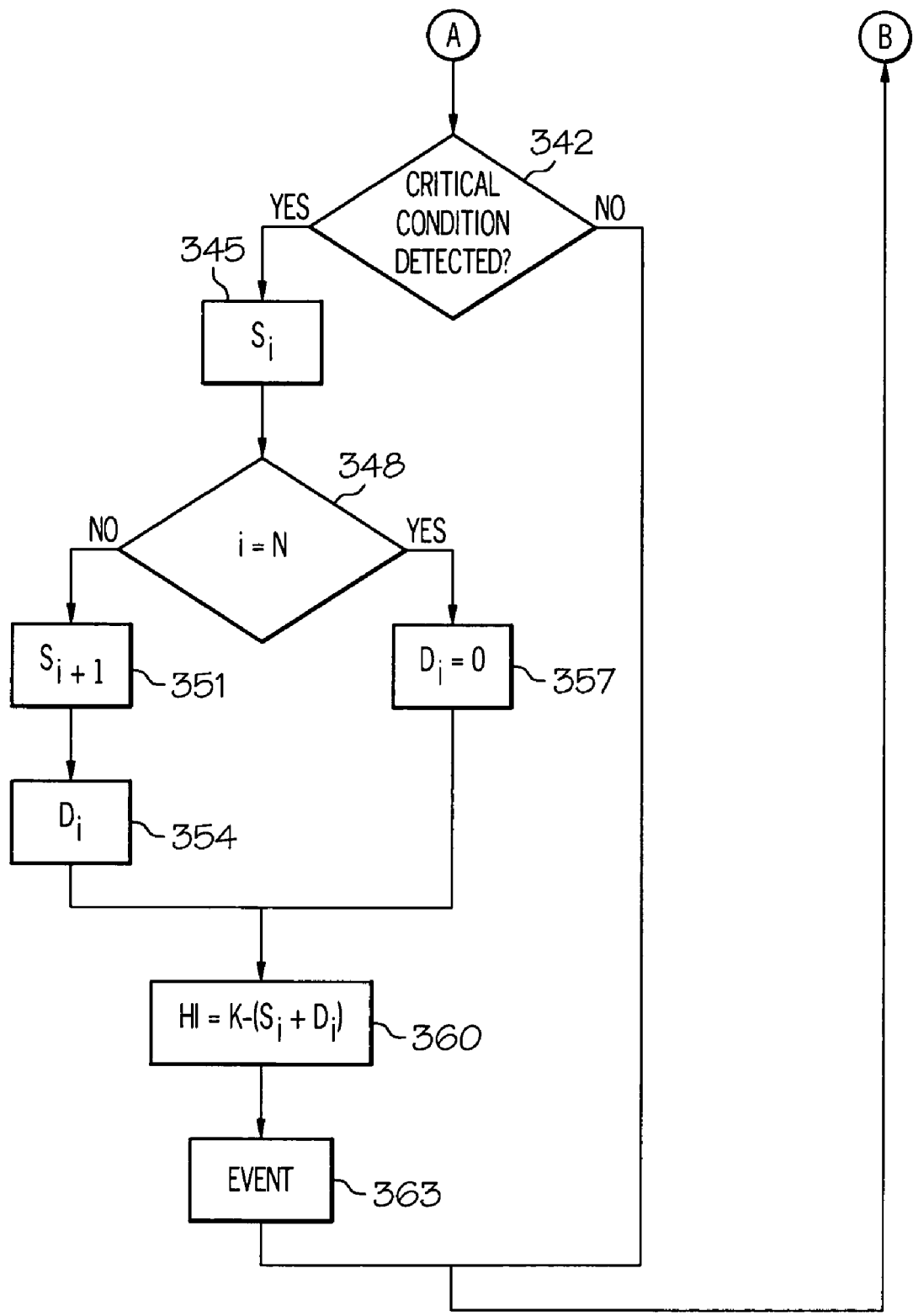

FIGS. 3A-3B show the flow of logic of an exemplary monitoring process that can be implemented in the above-described system, represented as a method 300. The method 300 begins at the start block 303 and then passes to block 306; in this phase, a generic application server measures a specific state parameter P whenever, for example, a corresponding time-out expires.

A loop is then performed for each critical condition defined in the corresponding table for the state parameter P, starting from the condition with the lowest severity. The loop is initialized at block 309, wherein the quantitative threshold $Q_1$ for the first critical condition is retrieved from the table. The flow of activity then branches at block 312 according to whether a current guard level has been entered. The detection of this event is based on the comparison between the state parameter P and its quantitative threshold $Q_i$ ($Q_1$ at the first iteration of the loop). If $P<=Q_i$ the blocks 315-324 are executed, whereas if $P>Q_i$ the blocks 325-333 are executed; the branches of the method then rejoin at block 336.

In block 315 ($P<=Q_i$), a test is made to determine whether one or more occurrences of the corresponding guard level have already been detected ($O_i>0$). In this case, the number of current holes for the critical condition is incremented at block 318 ($H_i=H_i+1$); the method then descends into block 321. The same point is also reached from block 315 directly when no occurrence of the guard level has been detected yet, so as to leave the corresponding counters unaffected. In block 321, if the maximum allowable number of holes for the critical condition is reached ($H_i=MH_i$), both the corresponding counters are reset to zero at block 324 ($O_i=0$, $H_i=0$); the method then continues to block 336. Otherwise, the same point is also reached from block 321 directly.

In block 325 ($P>Q_i$), the counter storing the current holes is reset to zero ($H_i=0$). The number of current occurrences for the critical condition is then incremented ($O_i=O_i+1$) at block 327. As determined by results of the test at block 330, if the minimum number of occurrences defining the critical condition is reached ($O_i=MO_i$), a corresponding identifier (i) is saved into a working variable (originally initialized to zero) in block 333. The method then continues to block 336. Otherwise, the same point is also reached from block 330 directly.

In block 336, a test is made to determine whether the critical condition with the highest severity has been processed (i=N). If not, the method 300 passes to the next critical condition at block 339, wherein the corresponding quantitative threshold $Q_{i+1}$ is retrieved from the corresponding table. The flow of activity then returns to block 312 for reiterating the operations described above. Conversely, once all the critical conditions have been treated, the loop ends passing to block 342.

A test is made at block 342 to determine whether at least one critical condition for the state parameter has been detected. For this purpose, the content of the working variable used to save the identifier of each detected critical condition is checked. If this variable is equal to zero, no critical condition has occurred; in this case, the flow of activity returns to block 306 so as to repeat the above-described operations. Conversely, the same variable identifies the most severe current critical condition, because its content is overridden whenever a critical condition with higher severity is detected. In response thereto, the corresponding severity index $S_i$ is retrieved at block 345. The method 300 then branches at block 348 according to whether the current critical condition is the one with the highest severity (i=N) or not.

In the negative case, the severity index of the next critical condition ($S_{i+1}$) is retrieved as well at block 351; the next critical condition is the first one (with the immediately higher severity) that has not been detected during the preceding operations. In block 354, the incremental index $D_i$ is calculated by applying the following formula:

$$D_i = (S_{i+1} - S_i) \cdot \frac{O_{i+1}}{MO_{i+1}}$$

In other words, the gap from the severity index of the current critical condition ($S_i$) to the severity index of the next critical condition ($S_{i+1}$) is split into a number of fractions equal to the minimum occurrences $MO_{i+1}$ that are required for reaching the next critical condition. The incremental index $D_i$ is then given by as many fractions as the current occurrences $O_{i+1}$ of the next critical condition. Therefore, the incremental index $D_i$ is directly proportional to the number of times the state parameter P has already reached the guard level of the next critical condition (i.e., how closely the state parameter P is approaching the next critical condition). For example, if $S_{i+1} - S_i = 20$ and $MO_{i+1}=3$, when $O_{i+1}=0$, we have $D_i=0$, meaning that the state parameter P is exactly in the current critical condition. When $O_{i+1}=1$, we have $D_i=6.7$, meaning that the state parameter P has started moving towards the next critical condition. When $O_{i+1}=2$, we have $D_i=13.3$, meaning that the state parameter P is close to the next critical condition. In this way, the incremental index $D_i$ provides an effective representation of the dynamics of approaching the next critical condition. The method 300 then descends into block 360, which is described below. Referring back to block 348, if the current critical condition is the one with the highest severity, the incremental index $D_i$ is set to zero ($D_i=0$), because no next critical condition exists. In this case as well, the method 300 then passes to block 360.

In block 360, the health indicator HI may be calculated by applying the following formula:

$$HI=K-(S_i+D_i)$$

In this way, the optimal value indicating that the application server has no problem (K=100) is decreased by the severity index $S_i$ of the current critical condition plus the incremental index $D_i$. As a result, the health indicator HI decreases as the state parameter P approaches the next critical condition. The health indicator HI then provides a single numerical representation of the situation of the application server, which representation is both simple and intuitive. Proceeding to block 363, the monitoring server is given notice of the problem, together with the health indicator HI and the current value of the state parameter P, so as to drive the action manager and/or the adapters accordingly. The flow of activity then returns to block 306.

An exemplary scenario of application of the above-described solution is shown in FIG. 4. This example relates to the three critical conditions (minor, warning and dangerous) that were defined in the foregoing. For the sake of convenience, their definitions are summarized in a table 405, which repeats the corresponding severity indexes $S_i$, quantitative thresholds $Q_i$, minimum occurrences $MO_i$, and maximum holes $Mh_i$.

Table 410 shows the condition of the application server at consecutive instants from $T_1$ to $T_{16}$. The first row tabulates the values of the state parameter P that were measured at the instants $T_1$-$T_{16}$, and another row tabulates the corresponding guard levels that were reached. Here, M, W and D stand for minor, warning, and dangerous, respectively. Of course, reaching the guard level W implies reaching the guard level M as well, and reaching the guard level D implies reaching both of the other guard levels W and M. Table 410 shows the values of the current occurrences and of the current holes at the same instants $T_1$-$T_{16}$ for the minor critical condition $(O_1, H_1)$, for the warning critical condition $(O_2, H_2)$, and for the dangerous critical condition $(O_3, H_3)$. The detection of any problem is denoted with the first letter of the relevant critical condition (M, W or D), together with the corresponding health indicator HI.

As can be seen, when the state parameter P enters the warning critical condition at time $T_4$, the health indicator is HI=30 (an occurrence for the dangerous critical condition has already been detected). On the other hand, when the state parameter P enters a (pure) critical condition with zero occurrences for the next critical condition, the health indicator HI corresponds exactly to the respective severity index $S_i$ (such as HI=20 at time $T_5$, HI=40 at times $T_6$-$T_7$, HI=60 at time $T_8$, HI=40 at time $T_{11}$, HI=40 at time $T_{13}$, and HI=60 at times $T_{14}$-$T_{15}$). Conversely, when the state parameter P approaches the next critical condition, the health indicator HI decreases accordingly. For example, HI=60, HI=53.3, and HI=46.7 from time $T_8$ to time $T_{10}$ as the state parameter P moves from the minor critical condition towards the warning critical condition, or HI=40, HI=30, and HI=40 from time $T_{11}$ to time $T_{13}$ as the state parameter P moves from the warning critical condition towards and away the dangerous critical condition.

In this way, the monitoring manager provides a sophisticated representation of the health of the system, which is based on the combination of the effective severity of the relevant critical conditions with their persistence. As a result, it is possible to have different levels of detail of the critical conditions; at the same time, this solution reduces the number of notifications that are supplied to an administrator by, for example, filtering out notifications that are caused by transient problems.

Moreover, the monitoring manager provides information about the actual dynamics of the system. Indeed, the administrator is now also aware of how the system is moving towards the next critical condition. Therefore, he or she is better informed when making decisions in every situation. For example, the administrator may choose to do nothing when the system remains around a minor critical condition, so as to avoid the risk of worsening the situation, or may choose to enforce a corrective action when the system is approaching a more serious critical condition. This is a proactive paradigm, which can prevent the actual occurrence of many problems, with a net beneficial impact on the reliability of the system.

Naturally, in order to satisfy local and specific requirements, a person skilled in the art may apply many modifications and alterations to the solution described above. Although the present invention has been described with a certain degree of particularity with reference to preferred embodiments thereof, it should be understood that various omissions, substitutions, and changes in the form and details, as well as other embodiments, are possible. Moreover, it is expressly intended that specific elements and/or method acts described in connection with any disclosed embodiment of the invention may be incorporated in any other embodiment as a general matter of design choice.

Similar considerations apply if the system has a different architecture or includes equivalent units. For example, the system may have a web farm with mirrored application servers. Moreover, each computer may have a different structure or may include equivalent elements such as cache memories temporarily storing the program or a part thereof to reduce accesses to the mass memory during execution. In any case, it is possible to replace the computer with any code execution entity such as a PDA, a mobile phone, and the like.

Even though in the preceding description reference has been made to a specific monitoring infrastructure, this is not to be intended as a limitation. Moreover, it is possible to measure different state parameters such as, for example, the number of processes running concurrently, free space available on the disk, and the like, or the state parameters may be aggregated before their analysis. Without departing from the principles of the invention, the guard levels can be detected when the state parameter falls below a respective threshold value, or a different number of critical conditions can be defined. For example, it is possible to have two levels only, or an additional level such as a fatal level for allowing calculation of the incremental index in any critical condition, even the critical condition with the highest severity index.

Nothing prevents the definition of critical conditions with other severity indexes, quantitative thresholds, maximum occurrences and/or minimum holes. In any case, the present invention has equal application when the persistence of the critical conditions is specified by any other temporal threshold. For example, it is possible to define a maximum number of nonconsecutive holes that are allowed between the occurrences, or any critical condition may be detected when the running average of the state parameter remains over a predefined threshold value for a period longer than another threshold value.

Moreover, it is also possible to have an implementation that continually collects the current value of the health indicator, by taking into account a normal condition that always occurs. For example, this feature can be exploited to display the current situation of every state parameter on a console, using an indicator such as a bar diagram.

Alternatively, the health indicator may be replaced with any other value representing the criticality of the state parameter, such as the simple severity index of the current critical condition plus the incremental index, so as to obtain a value that increases as the critical condition becomes more serious. In different embodiments of the invention, the aggregator may also provide equivalent information, such as the simple indication of the current critical condition together with the incremental index.

The definition of an incremental index that does not change linearly between each pair of adjacent severity indexes is not excluded. For example, the index may be based on the logarithm of the current occurrences of the next critical condition.

Moreover, the possibility of taking into account the current holes as well for calculating the incremental index is encompassed by the invention. For example, the index may be reduced accordingly to indicate that reaching of the next critical condition is less probable.

It is not strictly necessary to have quantitative thresholds that increase with the severity of the critical conditions, or maximum occurrences and/or minimum holes that decrease with the severity of the critical conditions. For example, two consecutive critical conditions may be defined by the same quantitative threshold with increasing minimum occurrences and decreasing maximum holes.

Alternatively, it is possible to calculate the incremental index with an equivalent formula based on, for example, the ratio between the running average of the state parameter and the quantitative threshold of the next critical condition.

Even though in the preceding description reference has been made to a specific service that is deployed by a corresponding provider, this is not to be intended as a limitation (with the execution of the same process that can be controlled by any other entity). For example, an implementation wherein the endpoints transmit all the measured values to the monitoring server, with a common aggregator that determines the occurrence of any problem, is within the scope of the invention. In any case, the same solution may also be applied in a stand-alone computer.

Similar considerations apply if the program is structured in a different way, or if additional modules or functions are provided; likewise, the different memory structures may be of other types, or may be replaced with equivalent entities not necessarily consisting of physical storage media. Moreover, the proposed solution may lend itself to be implemented with an equivalent method having, for example, similar or additional steps. In any case, the program may take any form suitable to be used by, or in connection with, any data processing system, such as external or resident software, firmware, or microcode, either in object code or in source code. Moreover, the program may be provided on any computer-usable medium, which may be any element suitable to contain, store, communicate, propagate, or transfer the program. Examples of such media are fixed disks where the program can be pre-loaded, removable disks, tapes, cards, wires, fibers, wireless connections, networks, broadcast waves, and the like. The medium may be, for example, electronic, magnetic, optical, electromagnetic, infrared, or semiconductor.

In any case, the present invention lends itself to be carried out with a hardware structure, for example integrated in chips of semiconductor material, or with a combination of software and hardware.

We claim:

1. A method for monitoring a data processing system, comprising:
    detecting at least one of a plurality of predefined critical conditions for a state parameter of the system, the critical conditions being ordered in a sequence with increasing severity, wherein each critical condition is detected in response to reaching a corresponding temporal threshold by a persistence of the state parameter at a corresponding guard level;
    determining an incremental index indicative of approaching a first non-detected critical condition in the sequence according to a comparison between a current persistence of the state parameter at the guard level of the first non-detected critical condition and the corresponding temporal threshold; and
    providing an indication of criticality of the state parameter based on a most severe detected critical condition in the sequence and the incremental index.

2. The method according to claim 1, wherein a severity index is associated with each critical condition, wherein severity indexes of the critical conditions in the sequence are strictly monotone, and wherein the indication of criticality is based on a sum of the incremental index with the severity index of the most severe detected critical condition.

3. The method according to claim 2, wherein the incremental index is based on a ratio of current persistence and temporal threshold of the first non-detected critical condition.

4. The method according to claim 3, wherein for each critical condition the guard level is defined by the state parameter reaching a corresponding quantitative threshold, and the temporal threshold is defined by a minimum number of repeated occurrences of the state parameter at the guard level.

5. The method according to claim 4, wherein for each critical condition the temporal threshold is further defined by a maximum number of non-occurrences of the state parameter at the guard level being allowed among the minimum number of occurrences.

6. The method according to claim 5, wherein the minimum number of occurrences and the maximum number of non-occurrences for the critical conditions in the sequence are monotone decreasing.

7. The method according to claim 5, wherein determining the incremental index comprises:
    multiplying a difference between the severity index of the first non-detected critical condition and the severity index of the most severe detected critical condition by a ratio between a value, equal to a current number of repeated occurrences of the state parameter at the guard level of the first non-detected critical condition without reaching the corresponding maximum number of non-occurrences, and the corresponding minimum number of occurrences.

8. The method according to claim 1, wherein execution of the method is controlled by a service provider.

9. A data processing system, comprising:
    means for detecting at least one of a plurality of predefined critical conditions for a state parameter of the system, the critical conditions being ordered in a sequence with increasing severity, wherein each critical condition is detected in response to reaching a corresponding temporal threshold by a persistence of the state parameter at a corresponding guard level;
    means for determining an incremental index indicative of approaching a first non-detected critical condition in the sequence according to a comparison between a current persistence of the state parameter at the guard level of the first non-detected critical condition and the corresponding temporal threshold; and
    means for providing an indication of criticality of the state parameter based on a most severe detected critical condition in the sequence and the incremental index.

10. A computer, comprising:
    a monitoring agent for measuring a state parameter of the system; and
    an aggregator configured for detecting at least one of a plurality of predefined critical conditions for the state parameter, the critical conditions being ordered in a sequence with increasing severity, wherein each critical condition is detected in response to reaching a corresponding temporal threshold by a persistence of the state parameter at a corresponding guard level,
    wherein said aggregator is further configured for determining an incremental index indicative of approaching a first non-detected critical condition in the sequence according to a comparison between a current persistence of the state parameter at the guard level of the first non-detected critical condition and the corresponding temporal threshold, and
    wherein said aggregator is further configured for providing an indication of criticality of the state parameter based on a most severe detected critical condition in the sequence and the incremental index.

11. The computer of claim 10, further comprising:
    a number of resource models for identifying the state parameter to be measured;
    a local log for saving state parameters measured by the monitoring agent; and
    an aggregator access table for storing definitions for a number of series of critical conditions for each of the state parameters.

* * * * *